United States Patent [19]

Speakman, Jr.

[11] Patent Number: 4,919,583

[45] Date of Patent: Apr. 24, 1990

[54] TRAILER

[76] Inventor: William J. Speakman, Jr., 6525 Millstone Ave., Baton Rouge, La. 70808

[21] Appl. No.: 252,108

[22] Filed: Oct. 3, 1988

[51] Int. Cl.$^5$ .................. B60P 1/36; E01C 19/20
[52] U.S. Cl. .................. 414/528; 414/520; 198/311; 198/314; 239/674
[58] Field of Search .............. 414/502, 519, 520, 528; 198/311, 314; 239/672, 674, 650

[56] References Cited

U.S. PATENT DOCUMENTS

| | | | |
|---|---|---|---|
| 1,656,631 | 1/1928 | Hammaker | 239/674 X |
| 1,764,019 | 6/1930 | Hardenbergh | 239/674 X |
| 1,924,825 | 8/1933 | Young | 239/672 |
| 2,093,300 | 9/1937 | Adams et al. | 214/33 |
| 2,577,310 | 12/1951 | Connelly | 275/2 |
| 2,697,609 | 12/1954 | Chase et al. | 414/528 X |
| 2,791,044 | 5/1957 | Hancock | 37/126 |
| 2,896,771 | 7/1959 | Mecham | 198/311 |
| 3,073,606 | 1/1963 | Hurt | 239/674 X |
| 3,187,910 | 6/1965 | Decker et al. | 414/502 X |
| 3,204,788 | 9/1965 | Kleinsorge | 214/83.26 |
| 3,365,050 | 1/1968 | Taylor | 198/311 |
| 3,367,636 | 2/1968 | Duecy | 198/311 X |
| 3,460,698 | 8/1969 | Harris | 414/502 |
| 3,754,711 | 8/1973 | Gledhill | 239/674 |
| 3,891,109 | 6/1975 | Olson | 414/502 |
| 3,927,780 | 12/1975 | Dearlove | 214/519 |
| 3,986,708 | 10/1976 | Hetzel et al. | 414/502 X |
| 4,078,685 | 3/1978 | Corbin et al. | 414/502 |
| 4,173,422 | 11/1979 | Baker et al. | 414/390 |
| 4,655,916 | 4/1987 | Schlesiger | 414/502 X |
| 4,767,063 | 8/1988 | Wall et al. | 239/672 |
| 4,795,264 | 1/1989 | Riker | 414/502 X |

FOREIGN PATENT DOCUMENTS

| 0933310 | 10/1951 | France | 239/672 |
|---|---|---|---|
| 2127377 | 4/1984 | United Kingdom | 414/528 |

Primary Examiner—Frank E. Werner
Assistant Examiner—John VandenBosche
Attorney, Agent, or Firm—Edgar E. Spielman, Jr.

[57] ABSTRACT

This invention relates to a trailer for transporting solid, loose materials. The trailer features an elongated frame which is attached to a towing vehicle and which carries a bin for containing the solid material. A discharge means is associated with the bin to effect discharge of the material therefrom. The material is conveyed after discharged by a conveying means along a path which extends from the discharge means, over at least a portion of the towing vehicle, and to a dumping point forward of the towing vehicle. This path lies substantially in the vertical plane of the long axis of the trailer.

6 Claims, 5 Drawing Sheets

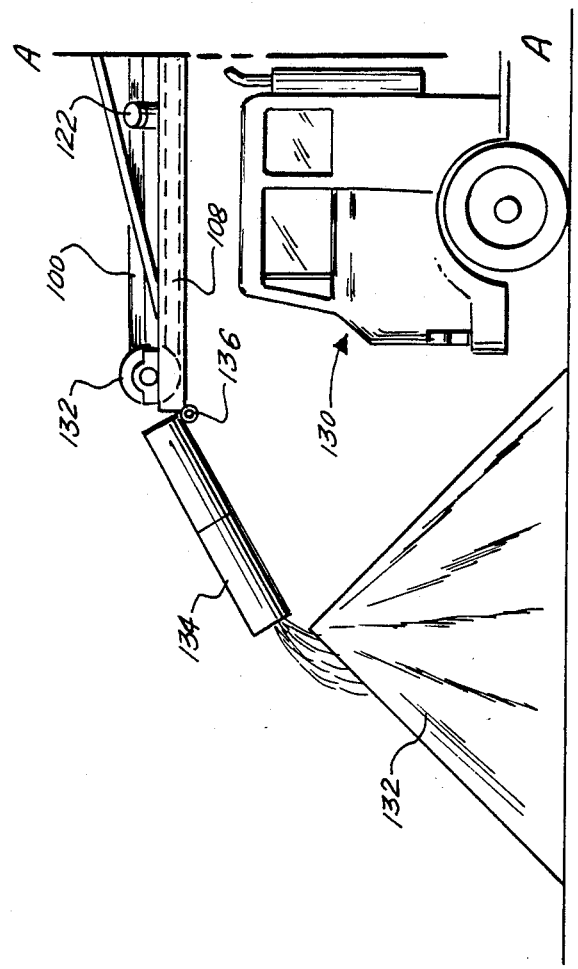

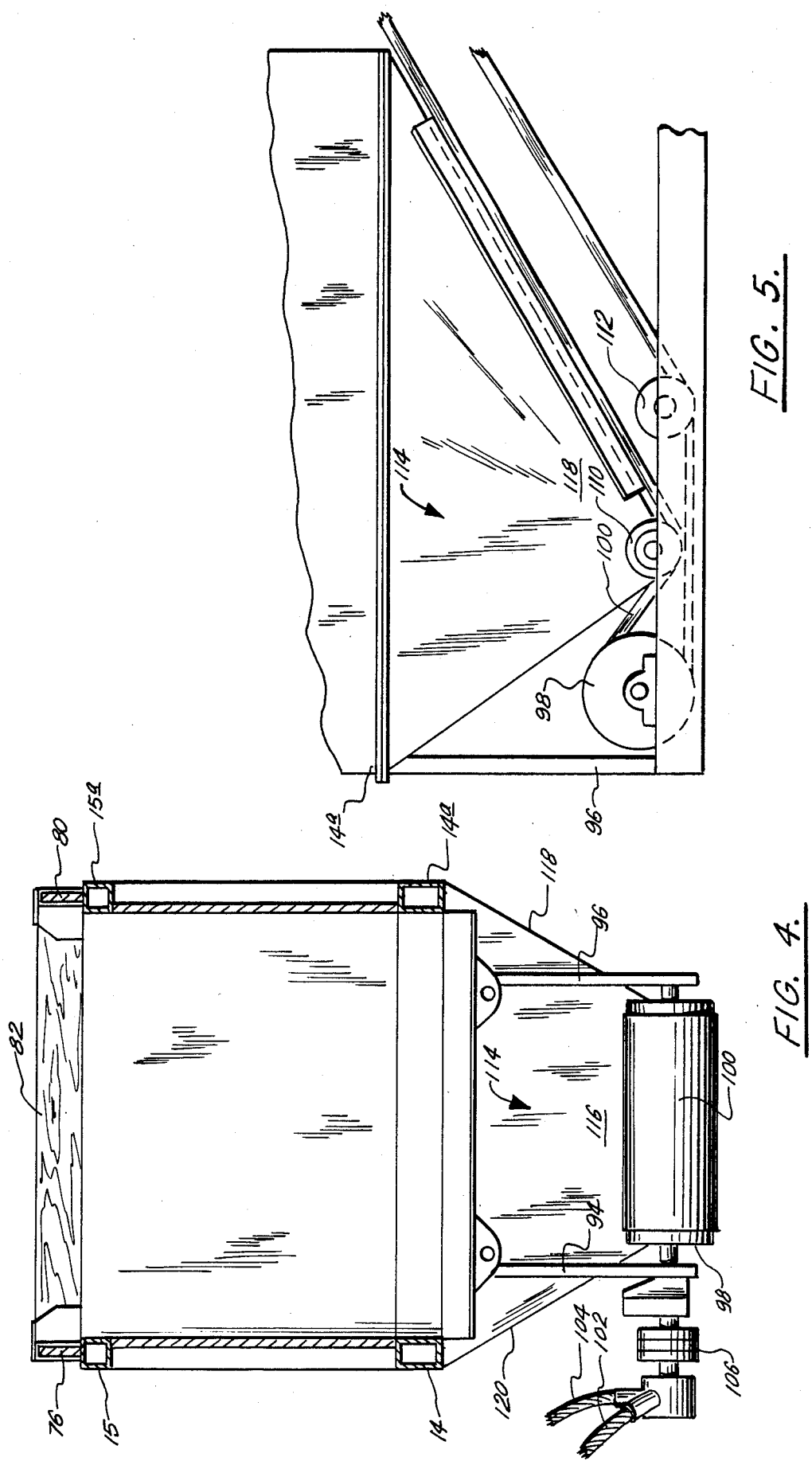

TRAILER

BACKGROUND OF THE INVENTION

This invention relates to a trailer for transporting and dumping a loose, solid material such as gravel, crushed rock, asphalt, shell, sand, salt, etc.

In the building or maintenance of roadways, it is almost always necessary to transport to the roadway the solid materials used in the operations. The amount of solid materials used can be enormous, and thus, their transportation is a large contribution to the operation's costs. Transportation costs can be lowered if the transportation time can be minimized. Transportation time includes loading time, transit time to the roadway, dumping time and transit time back to the loading point.

In most operations, the transportation vehicles conventionally used are dump trucks and tractor-semitrailer rigs. To dump the solid material from these type of vehicles, the truck bed or semitrailer, as the case may be, is elevated at its forward end so that the solid material will slide to the rear and through a gate provided at the rear of the truck bed or semitrailer. The dumping rate is controlled by the extent of the elevation effected. If the solid material needs only to be dumped in a pile, the dumping can be effected quickly. However, as is usually the case in road building and maintenance, the dumping of the solid material is not into a pile but rather as a feed to a road surfacing machine, such as an asphalt or rock spreader. The spreaders are usually self-propelled and thus, the transportation vehicle must follow or lead the road surfacing machine to provide the feed. When the road surface machine requires that the feed to it be at its rear, it is necessary for the conventional dump truck or tractor-semitrailer rig to follow the road surfacing machine while traveling backward. Due to sight limitations and the difficulties of backing, the dumping time is longer than would be the case without such limitations and difficulties. Further, the dump rate must be coordinated with the feed rate required by the road surfacing machine.

It is therefore an object of this invention to provide a trailer for transporting and dumping loose, solid materials in which the dumping of the solid materials from the trailer is performed in front of the towing vehicle and is performed at an easily controlled rate.

THE INVENTION

The trailer of this invention achieves the foregoing objects and includes an elongated frame having, adjacent one of its ends, an attachment device for attaching the frame to a towing vehicle, and, adjacent the other of its ends, at least one axle and wheel set. Carried by the frame is a bin which holds loose, solid material and from which the solid material is discharged. The bin has side walls which downwardly converge towards one another at their lower extents and a bottom wall which is connected to the side walls at the latter's lower edges. The bin provides a volume which is sufficient to hold the desired amount of loose, solid materials. Associated with the bin is a discharge system which effects discharge of the solid material from the bin when desired. As the solid material is discharged from the bin, a conveying system carries the solid material along a path which extends from the discharge means, over at least a portion of the towing vehicle and to a dumping point forward of the towing vehicle. An important feature of the conveying system is that the path provided by it lies substantially in the vertical plane of the long axis of the trailer.

In most instances, due to its large load capacity, the trailer is a semi-trailer and the attachment device is a fifth wheel. A self-supporting trailer may be used, and may be preferable when the towing vehicle provides only a towing hitch which is incapable of supporting the weight of a semi-trailer.

With the bin having side walls which downwardly converge towards one another, efficient movement of the loose, solid material during discharge is facilitated. It has been found especially beneficial to provide the bottom wall portion of the bin with an upwardly extending ridge which substantially lies in the vertical plane of the long axis of the trailer. Such a ridge yields a bottom wall having two lowest areas at which the discharge system can be located thereby increasing the efficiency of discharge. The discharge system is most easily provided by gated discharge ports in the bottom wall of the bin.

The conveying system is preferably provided by a powered conveyor belt which follows the above-described conveying path. At the dumping point, i.e. the forward end of the conveying system, it is additionally desirable that a dumping chute be provided which is capable of angular movement so that the direction of the solid material dumping can be further adjusted.

As can be appreciated from the foregoing, the trailer of this invention provides for transportation and dumping of loose, solid material, which dumping occurs forward of the towing vehicle. With forward dumping, the driver of the towing vehicle has a clear line of sight to the dumping activity and has the advantage of driving, during dumping, in a forward direction which avoids problems such as jackknifing, etc. Further, by providing a conveying system, such as a powered conveyor belt, the rate of dumping is easily controlled. The control for the conveying system can be placed within the cab portion of the towing vehicle.

These and other features of this invention contributing to satisfaction in use and economy in manufacture will be more fully understood from the following description of preferred embodiments of the invention when taken in connection with the accompanying drawings in which identical numerals refer to identical parts and in which:

FIG. 1 and FIG. 1a, in combination, show a side elevational view of a trailer of this invention attached to a truck tractor;

FIG. 2 is a partial top plan view of the trailer shown in FIGS. 1 and 1a;

FIG. 2A is a sectional view taken through section line 2a—2a in FIG. 2;

FIG. 3 is a sectional view taken through section line 3—3 in FIG. 2;

FIG. 4 is a sectional view taken through section line 4—4 in FIG. 1;

FIG. 5 is an enlarged side elevational view of the discharge area of the trailer shown in FIGS. 1 and 1a;

Figure 1:
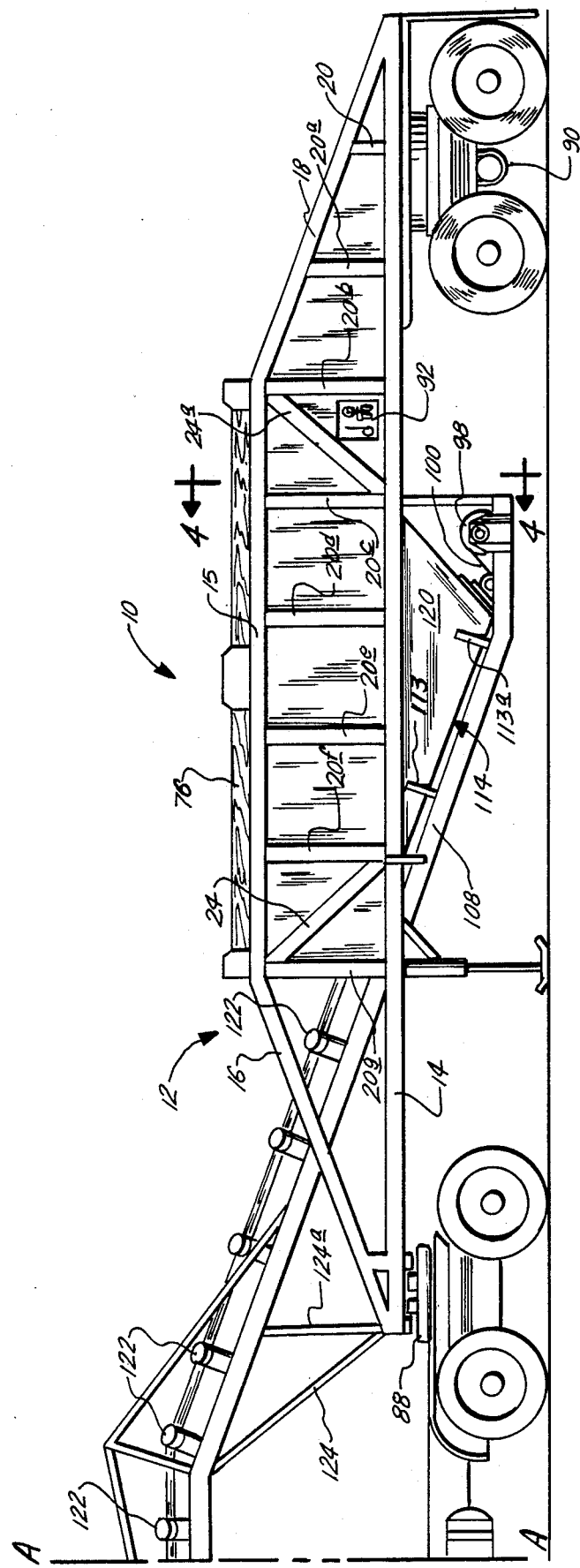

Referring now to FIGS. 1-5, there can be seen a trailer of this invention, generally designated by the numeral 10, in towing attachment to a tractor truck 130. The trailer shown in these Figures is of the semi-trailer type, however, it should be understood that fully-supported trailers may also be utilized in keeping with the features of the present invention. Trailer 10 comprises a frame 12 which has lower horizontal members 14 and 14a which extend substantially the entire length of frame 12. Upwardly displaced from lower horizontal frame members 14 and 14a are upper horizontal frame members 15 and 15a. These latter frame members are not of the same length as lower horizontal frame members 14 and 14a but rather are joined to the terminal ends of lower horizontal frame members 14 and 14a by way of diagonal frame members 16, 16a, 18 and 18a. Vertical frame members 20, 20a, 20b, 20c, 20d, 20e, 20f and 20g connect lower horizontal frame member 14 to upper horizontal frame member 15 and diagonal frame member 18. To provide rigidity diagonal frame members 24 and 24a are provided. Complimentary vertical and diagonal frame members, which are not shown, are provided on the opposite side of trailer 10. To add strength and rigidity, there are provided cross-frame members 22, 2a, 22b, 22c and 22e. Cross-frame members 22e and 22c extend across trailer 10 and are located adjacent the terminal ends of upper horizontal frame members 15 and 15a. Cross-frame members 22, 22a and 22b likewise extend across the width of trailer 10 but connect the diagonal frame members 18 and 18a. Further providing rigidity for trailer 10 is A-frame member 26.

Figures 2, 2A, 3:
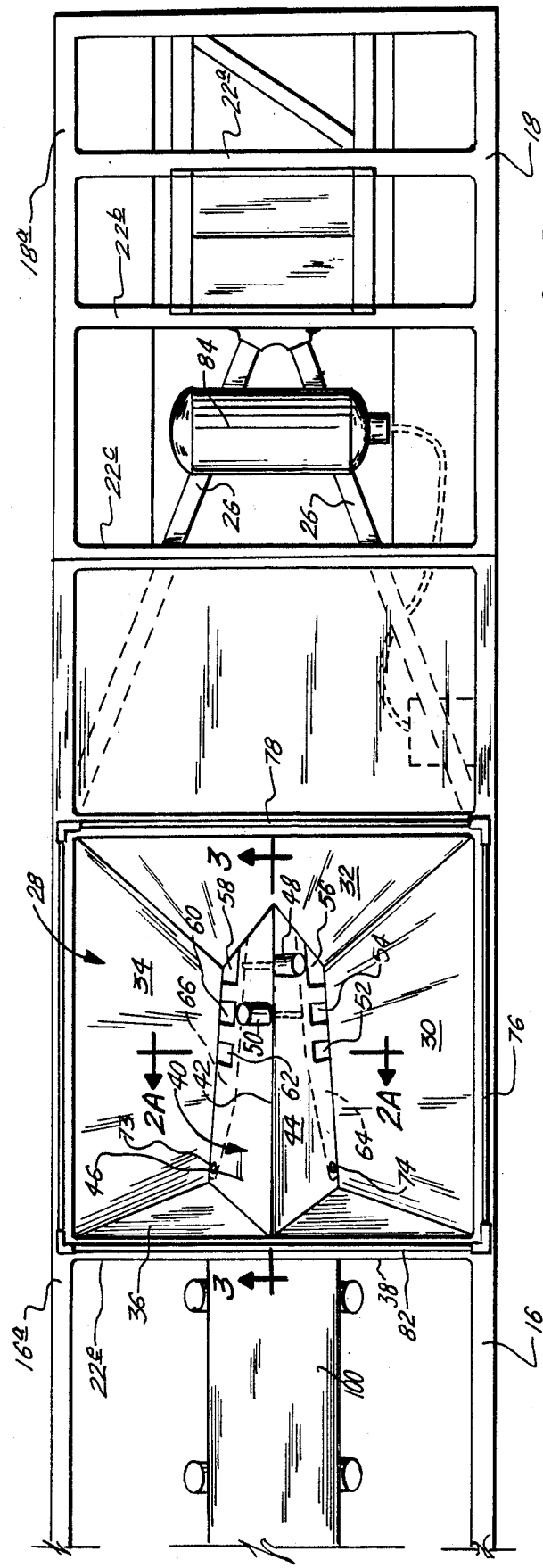

Trailer 10 provides for a bin, which is generally designated by the numeral 28. Bin 28 is carried within the boundaries defined by frame 12. Bin 28 has side walls 30, 32, 33, 34, 36 and 38. As can be seen in FIG. 2, these side walls converge towards one another at their lowermost extent. Defining the upper extent of bin 28 are wooden fences 76, 78, 80 and 82. Bin 28 additionally is defined by a bottom wall, which is generally designated by the numeral 40. Bottom wall 40 is comprised of two walls, 44 and 46, which, at their lowermost extent, are connected at the lowermost edges of the just-described side walls of bin 28. As can be seen in FIG. 2, walls 44 and 46 converge towards the center line of trailer 10 in an upward direction and meet at bottom wall ridge 42. Wall 46 has three discharge ports 58, 60 and 62, while wall 44 has discharge ports 52, 54 and 56.

The number of discharge ports is not critical nor is their configuration, provided that the discharge ports enable efficient flow of loose, solid material carried within bin 28. For the trailers shown in the drawings, these discharge ports are gated, with discharge ports 58, 60 and 62 being gated by gate 66 and with discharge ports 52, 54 and 56 being gated by gate 64. Both gates are pivoted at, respectively, pivot points 73 and 74. Movement of gates 64 and 66 between the open and closed positions is provided by means of hydraulic or pneumatic cylinders. The pneumatic cylinder which operates gate 66 is housed within housing 48 while the pneumatic cylinder powering gate 64 is housed within housing 50. Housings 48 and 50 extend into the bin and are mounted respectively on walls 44 and 46. Each of the gates move between the open and closed position along a path which is along the outside surface of wall 44 and wall 46, as the case may be. To support the gates during this movement, there are provided gate brackets for each gate. In FIG. 3, for gate 66, these brackets are shown and numbered 68, 70 and 72. It is to be understood that, while not shown, similar brackets are provided for gate 64. Note that brackets 68, 70 and 72 are mounted on the outside surface of wall 46. A like mounting is used for the brackets of gate 64 but on wall 44. Power for the pneumatic pistons used to move gates 64 and 66 is provided by a conventional pneumatic system which can be mounted to trailer 10 or carried within truck tractor 130. For the trailer shown in the drawings, the pneumatic system is carried by trailer 10 and includes tank 84, control panel 92 and a compressor which is not shown.

In some instances, it may be desirable to provide gates which can be partially or totally open so as to have some control over the rate of discharge of the solid material from bin 28. To effect this arrangement, the gates can be moved by use of an electric motor, which, conveniently, can be controlled from inside tractor truck 130.

Below bin 28 there is provided a chute which is generally designated by the numeral 114. As can be seen in FIGS. 1, 4 and 5, chute 114 is comprised of chute sidewalls 118 and 120 and rear chute wall 116. Chute 114 acts to direct and maintain the path of the loose, solid material which is discharged from bin 28 onto conveyor belt 100.

Conveyor belt 100 extends from the lower part of trailer 10, as shown in FIGS. 1 and 4, to a point which is over truck tractor 130 to a point which is in front of truck tractor 130. As can be seen in FIGS. 1, 1a and 2, conveyor belt 100 defines a path which is substantially in the vertical plane of the center axis of trailer 10. Conveyor belt 100, at its location beneath bin 28, is mounted to drive pulley 98 as can be seen in FIG. 4. Drive pulley 98 is rotatably mounted to mounting brackets 94 and 96 which are carried by the underside of frame 12. Driving drive pulley 98 is drive motor 106 which, for the trailer shown, is a hydraulic motor, and which is in fluid communication with hydraulic lines 102 and 104.

So as to receive the loose, solid material from bin 28, conveyor belt 100 takes a path which is beneath chute 114. Return pulley 112 directs conveyor belt 100 to drive pulley 98 while idler pulley 110 maintains the outgoing conveyor belt in the before-described position beneath chute 114. Conveyor belt 100 is carried on conveyor belt rollers 122 which extend essentially along the entire path of conveyor belt 100. Conveyor belt rollers 122 are rotatably carried on conveyor belt support frame 108.

The conveyor belt support frame 108 is supported over fifth wheel 88 of tractor truck 130 by way of supports 124 and 124a. Conveyor belt's support frame 108 is supported at its lower or rearward end by means of struts 113 and 113a which are shown in FIG. 1 and by a similar pair of support struts which would be located on the trailer on the side opposite that which is shown in FIG. 1. At the forwardmost end of the path traveled by conveyor belt 100 is terminal pulley 132. For the embodiment shown in FIGS. 1-5, there is an optional directional discharge chute 134 which is pivotally attached to frame 12 by pivot point 136. Directional discharge chute 134 receives loose, solid material from conveyor belt 100 and can be directed so as to dump the loose, solid material at a point which extends from just in front of truck tractor 130 to a point more forward of truck tractor 130.

Trailer 10 is mounted to truck tractor 130 by means of a conventional fifth wheel 88. Trailer 10 is supported at its other end by a tandem tire and axle set 90.

Figure 6:
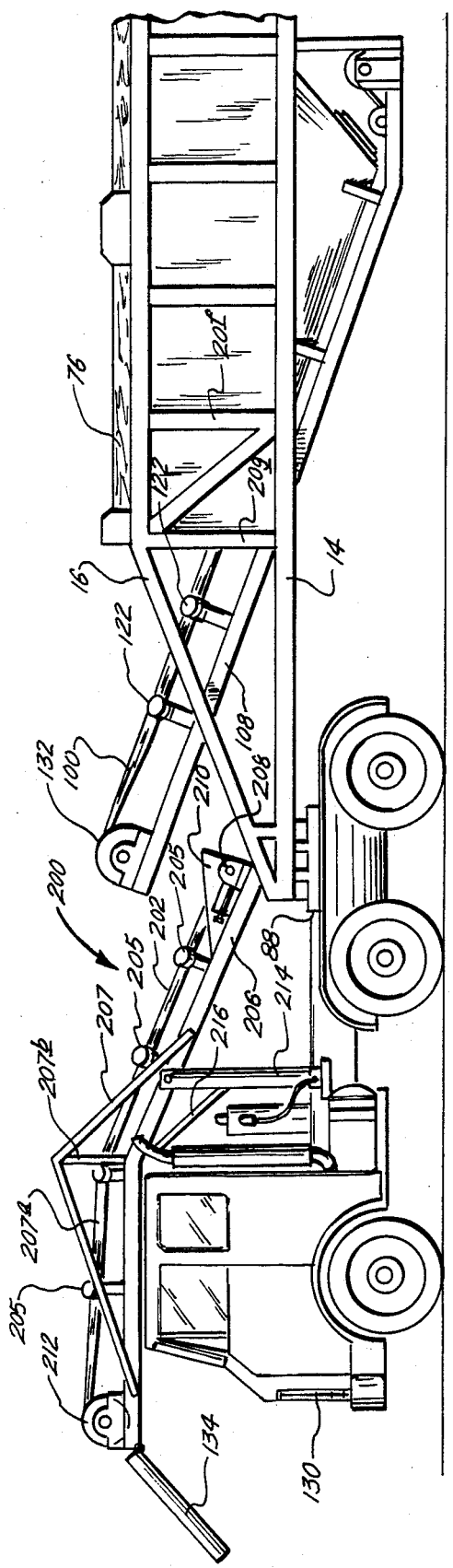
FIG. 6 is a partial, side-elevational view of another trailer of this invention attached to a tractor truck.
Figure 6A:
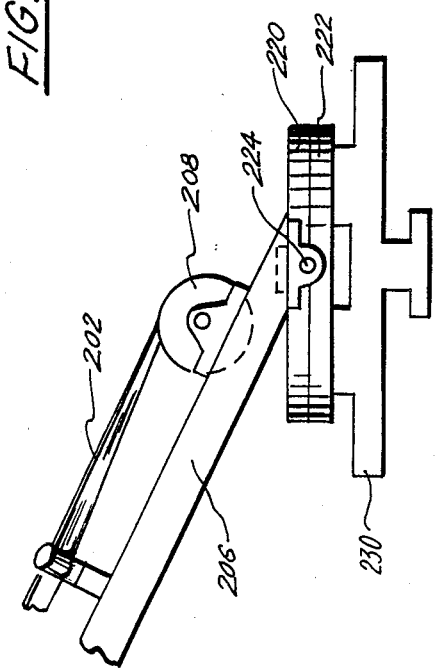
FIG. 6A is a partial, side elevational view of the trailer's fifth wheel plate and other adjacent structure.

In FIGS. 6 and 6a there is shown another trailer of this invention. For this trailer, conveyor belt 100 does not extend forward of truck tractor 130 but rather extends to a point which is above the fifth wheel attachment of trailer 10 to truck tractor 130. To provide for the remainder of the path along which the loose, solid material will flow to a position forward of truck tractor 130, there is conveying system 200. Conveying system 200 includes a conveyor belt support frame 206 which is mounted to truck tractor 130 by way of vertical supports, one of which is numbered 214 and the other of which is not shown. A pair of diagonal supports, one being numbered 216 and the other not shown, are also used. As can be seen in FIG. 6, conveyor belt support frame 206 has a diagonally, upwardly extending portion and an essentially horizontal portion. To rigidify conveyor belt support frame 206 along this path, there are provided two frames which are located on each side of conveyor belt support frame 206.

In FIG. 6, one of these frames is shown and is comprised of frame members 207, 207a and 207b. The other frame is identical, but not shown. Conveyor belt support frame also carries the conventional conveyor belt rollers 205. Conveyor belt 202 is driven by drive pulley 208 and is routed to terminal pulley 212. Drive pulley 208 can be powered by a conventional hydraulic motor which is attached to the truck tractor hydraulic system. Chute 134 can be provided and will be of the same type and provide the same function as that previously described for directional discharge chute 134. Conveyor belt support frame 206 is pivotally mounted to the fifth wheel plate 230 of trailer 10. The mount is such that a swivel and pivoting connection is made. To this end there is provided horizontal swivel plates 222 and 220 which are mounted on the top portion of the fifth wheel 230 of trailer 10. The pivot mount at pivot point 224 of conveyor belt support frame 206 is shown in FIG. 6a. All other aspects of the trailer shown in FIGS. 6 and 6a are the same as they are for the trailer shown in FIGS. 1-5.

In operation, the trailer of FIGS. 1-5 and the trailer of FIGS. 6 and 6a operate in substantially the same manner. Loose, solid material is first loaded into bin 28. When it is desired to dump the loose, solid material, gates 66 and 64 are brought to the open position and conveyor belt 100 is started. The loose, solid material flows through the discharge ports onto the conveyor belt and is conveyed to the forward end of the trailer. In the embodiment of FIGS. 1-5, conveyor belt 100 carries the solid, loose material to a point forward of tractor truck 130 for dumping. As can be appreciated, for the embodiment of FIGS. 1-5, truck tractor 130 can be located underneath conveyor belt 100 when trailer 10 and truck tractor 130 are along the same center axis. However, when truck tractor 130 is in a turn, conveyor belt 100 will lay above but at an angle to the center axis of truck tractor 130.

For the trailer shown in FIGS. 6 and 6a, the path along which the loose, solid material will travel provides that the material is dumped always forward of and along the center line of truck tractor 130. Loose, solid material will fall from conveyor belt 100 into catch bin 210 located at the lowermost extent of conveyor 202. Conveyor 202 will then convey the loose, solid material to a point along the center line of truck tractor 130 and dump it forward of truck tractor 130.

It is to be understood from the foregoing that various components used to construct the trailers shown in the Figures are conventional. For example, the conveyor belts used operate and are powered in a conventional manner. The structural aspects of frame 12 can be other than that shown for the two trailers provided that such frames do not interfere with the functions achieved by the trailers of this invention. The powering of the conveyor belts can be by way of a hydraulic system carried by truck tractor 130 or can be powered by way of a direct mechanical drive carried by trailer 10.

I claim:
1. A towing vehicle and an attached trailer for dumping a loose, solid material while said towing vehicle and said attached trailer are in a forward motion, said trailer comprising:
   (a) an elongated frame having (i), adjacent one of its ends, attaching means for attaching said frame to said towing vehicle, and (ii), adjacent the other of its ends, at least one axle and wheel set;
   (b) a bin carried by said frame, said bin having side walls which downwardly converge towards one another at their lower extent, and a bottom wall connected to said side walls at their lower edges, said bin being dimensioned to have a depth sufficient to hold the desired amount of solid material;
   (c) a discharge means associated with said bin to effect discharge of said solid material from said bin when desired; and
   (d) conveying means to convey said solid material, as it is discharged from said bin, along a path which is substantially in the vertical plane of the long axis of said trailer and which extends from the discharge means, over at least a portion of said towing vehicle, to a dumping point whereby said dumping point is in front of said towing vehicle when said towing vehicle and trailer are being driven forward and when the vertical planes of the long axis of said towing vehicle and said trailer are in substantial alignment
   (e) wherein said trailer is a semitrailer and said attaching means is a fifth wheel.
2. The trailer of claim 1 wherein said bottom wall of said bin has an upwardly extending ridge which substantially lies in said vertical plane.
3. The trailer of claim 1 wherein said discharge means comprises gated discharge ports in said bottom wall.
4. The trailer of claim 1 wherein said conveying means comprises a powered conveyor belt.
5. The trailer of claim 4 wherein said conveying means additionally comprises a dumping chute at said dumping point for achieving the direction that said solid material is dumped.
6. The trailer of claim 1 wherein said conveying means comprises a first powered conveyor belt mounted to said trailer and a second powered conveyor belt pivotally mounted to said trailer and fixedly mounted to said towing vehicle, said first powered conveyor belt being located so that its point of discharge effects a feed of said material to said second powered conveyor belt.

* * * * *